(12) United States Patent
Durali et al.

(10) Patent No.: US 11,001,010 B2
(45) Date of Patent: May 11, 2021

(54) INSTALLING PIPELINE SEGMENTS WITHIN A CONDUIT

(71) Applicants: Mohammad Durali, Tehran (IR); Seyd Hossein Mousavi, Tehran (IR); Amin Jamalimehr, Isfahan (IR); Farshad Fadakar Kourkah, Tehran (IR); Mohamad Ali Soleimani, Tehran (IR)

(72) Inventors: Mohammad Durali, Tehran (IR); Seyd Hossein Mousavi, Tehran (IR); Amin Jamalimehr, Isfahan (IR); Farshad Fadakar Kourkah, Tehran (IR); Mohamad Ali Soleimani, Tehran (IR)

(73) Assignees: DURALI SYSTEM DESIGN & AUTOMATION CO, Tehran (IR); SHARIF UNIVERSITY OF TECHNOLOGY, Tehran (IR)

( * ) Notice: Subject to any disclaimer, the term of this patent is extended or adjusted under 35 U.S.C. 154(b) by 14 days.

(21) Appl. No.: 16/522,085

(22) Filed: Jul. 25, 2019

(65) Prior Publication Data
US 2019/0344508 A1 Nov. 14, 2019

Related U.S. Application Data

(60) Provisional application No. 62/702,929, filed on Jul. 25, 2018.

(51) Int. Cl.
*F16L 25/00* (2006.01)
*B29C 65/78* (2006.01)

(52) U.S. Cl.
CPC ...... *B29C 65/7838* (2013.01); *F16L 25/0018* (2013.01)

(58) Field of Classification Search
CPC ............ B29C 65/7838; B29C 65/7802; F16L 25/0018
USPC .................................................. 405/133, 134
See application file for complete search history.

(56) References Cited

U.S. PATENT DOCUMENTS 4,473,322 A * 9/1984 Echols ...................... E21D 5/04
405/133
2010/0319932 A1* 12/2010 Angelle .................. E21B 19/07
166/380

* cited by examiner

*Primary Examiner* — Sean D Andrish
(74) *Attorney, Agent, or Firm* — Bajwa IP Law Firm; Haris Zaheer Bajwa (57) ABSTRACT

A method for installing pipeline segments within a conduit. The method includes a step of securing a first pipe segment of the pipeline segments at a top end of the conduit, a step of aligning a main axis of a second pipe segment of the pipeline segments with the main axis of the pipeline, a step of lifting the second pipe segment from a first position associated with a bottom end of the conduit to a second position adjacent to the first pipe segment, a step of abutting a top rim of the second pipe segment against a bottom rim of the first pipe segment, and a step of attaching the top rim of the second pipe segment to the bottom rim of the first pipe segment.

10 Claims, 11 Drawing Sheets

100

```
┌─────────────────────────────────────────────────┐
│  Securing a first pipe segment of the pipeline  │
│           at a top end of the conduit.          │──102
└─────────────────────────────────────────────────┘
                        │
                        ▼
┌─────────────────────────────────────────────────┐
│ Aligning a main axis of a second pipe segment   │
│  of the pipeline with a main axis of the        │──104
│                  pipeline.                      │
└─────────────────────────────────────────────────┘
                        │
                        ▼
┌─────────────────────────────────────────────────┐
│ Lifting the second pipe segment from a first    │
│ position associated with a bottom end of the    │
│ conduit to a second position adjacent to the    │──106
│               first pipe segment.               │
└─────────────────────────────────────────────────┘
                        │
                        ▼
┌─────────────────────────────────────────────────┐
│ Abutting a top rim of the second pipe segment   │
│  against a bottom rim of the first pipe segment.│──108
└─────────────────────────────────────────────────┘
                        │
                        ▼
┌─────────────────────────────────────────────────┐
│ Attaching the top rim of the second pipe        │
│ segment to the bottom rim of the first pipe     │──110
│                  segment.                       │
└─────────────────────────────────────────────────┘
```

FIG. 7 ing pipe segments of a penstock of a hydropower plant, installation of pipe
INSTALLING PIPELINE SEGMENTS WITHIN A CONDUIT

CROSS-REFERENCE TO RELATED APPLICATION

This application claims the benefit of priority from U.S. Provisional Patent Application Ser. No. 62/702,929 filed on Jul. 25, 2018, and entitled "NEW METHOD AND APPARATUS FOR INSTALLATION OF VERTICAL PENSTOCK IN HYDRO POWER PLANT" which is incorporated herein by reference in its entirety.

TECHNICAL FIELD

The present disclosure generally relates to pipeline installation, and particularly to a method for installing a pipeline within a conduit.

BACKGROUND

Installing large-diameter pipelines, such as those used as penstocks of hydropower plants, requires special equipment and joint efforts of many workers. Different systems and methods may be utilized for installing inclined or vertical large-diameter pipelines. For example, in a pipeline installation method for installing large-diameter pipe segments of a penstock of a hydropower plant, installation of pipe segments may be carried out from a bottom end of the penstock toward a top end of the penstock. In this method, first a pipe segment may be installed at the bottom end of the penstock and then other pipe segments may be fed into the penstock from the top end of the penstock. Each subsequent pipe segment may be lowered down into the penstock from the top end toward the bottom end of the penstock and then may be attached on a top rim of a previously installed pipe segment.

Installing an inclined or vertical penstock may require installing pipe segments within an inclined or vertical conduit or well, which may have been dug before installing the pipe segments. Utilizing a bottom-up method as described above may require first installing a pipe segment at a bottom end of the conduit or well and then feeding other subsequent pipelines from a top end of the well towards the bottom end of the conduit or well. Each pipe segment may then be welded onto a top rim of a previously installed pipe segment. This bottom-up installation method may be associated with serious risks for the workers and for the equipment. For example, rock fractures that may have been created on an inner surface of the conduit or well during the dig or water penetration into the conduit or the well may lead to rocks being detached from an inner surface of the conduit or well and fall freely into the conduit or well. This dangerous falling of rocks is referred to herein as rockfall. In a bottom-up method, workers are exposed to the rockfall within previously installed pipe segments, increasing the risks to workers in utilizing this approach.

One way to address the issue of rockfall is to consolidate an inner wall of the conduit or well before installation of a pipeline within the conduit or well. However, consolidating the inner wall of the conduit may be expensive and time-consuming. There is, therefore, a need for a fast and safe pipeline installation method for installing pipe segments within an inclined or vertical conduit.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description below and the drawings.

According to one or more embodiments, the present disclosure describes a method for installing a pipeline within a conduit. In an exemplary embodiments, the method may include a step of securing a first pipe segment of the pipeline at a top end of the conduit, a step of aligning a main axis of a second pipe segment of the pipeline with the main axis of the pipeline, a step of lifting the second pipe segment from a first position associated with a bottom end of the conduit to a second position adjacent to the first pipe segment, a step of abutting a top rim of the second pipe segment against a bottom rim of the first pipe segment, and a step of attaching the top rim of the second pipe segment to the bottom rim of the first pipe segment.

In an exemplary embodiment, the method may further include a step of aligning a main axis of each pipe segment of the pipeline with the main axis of the pipeline, a step of lifting the each pipe segment from a first position associated with the bottom end of the conduit to a respective position adjacent to a previously installed pipe segment, a step of abutting a top rim of the each pipe segment against a bottom rim of the previously installed pipe segment, and a step of attaching the top rim of the each pipe segment to the bottom rim of the previously installed pipe segment.

In an exemplary embodiment, securing the first pipe segment at the top end of the conduit may include mounting the first pipe segment onto a hanger structure from a top end of the first pipe segment. In an exemplary embodiment, the hanger structure may include a collar, and a plurality of legs. In an exemplary embodiment, a main axis of the collar may be aligned with the main axis of the pipeline. In an exemplary embodiment, the plurality of legs may be interconnected between the collar and a ground surrounding a periphery of the top end of the conduit. In an exemplary embodiment, the plurality of legs may maintain the main axis of the collar aligned with the main axis of the pipeline. In an exemplary embodiment, securing the first pipe segment at the top end of the conduit may include coupling the top end of the first pipe segment with the collar.

In an exemplary embodiment, lifting the second pipe segment may include lifting the second pipe segment utilizing a lifting mechanism coupled to the second pipe segment. In an exemplary embodiment, the lifting mechanism may include a lifting assembly including a chain sling. The chain sling may include a main hook, a plurality of connecting hooks, and a plurality of chains.

In an exemplary embodiment, the plurality of connecting hooks may be releasably connected to an inner surface of the second pipe segment. In an exemplary embodiment, the plurality of chains may interconnect the plurality of connecting hooks and the main hook. In an exemplary embodiment, lifting mechanism may further include a winch that may be connected to the main hook utilizing a main cable. In an exemplary embodiment, lifting the second pipe segment may include winding up the main cable utilizing the winch.

In an exemplary embodiment, lifting the second pipe segment may include maintaining an alignment between the main axis of the second pipe segment and the main axis of the pipeline utilizing the lifting assembly. In an exemplary embodiment, the lifting assembly may further include a cylindrical frame coaxially disposed within the second pipe segment. In an exemplary embodiment, maintaining an alignment between the main axis of the second pipe segment and the main axis of the pipeline may include maintaining a first gap between an outer surface of the cylindrical frame and an inner surface of the second pipe segment constant by extending a plurality of retractable wheels between the outer surface of the cylindrical frame and the inner surface of the second pipe segment.

In an exemplary embodiment, each retractable wheel of the plurality of retractable wheels may include a retractable arm pivotally coupled to the outer surface of the cylindrical frame from a first end of the retractable arm, and a wheel rotatably coupled to a second opposing end of the retractable arm.

In an exemplary embodiment, extending the plurality of retractable wheels between the outer surface of the cylindrical frame and the inner surface of the second pipe segment may include pivotally rotating the retractable arm from a retracted position to an extended position. In an exemplary embodiment, a main axis of the retractable arm may be parallel to a main axis of the cylindrical frame in the retracted position. In an exemplary embodiment, the main axis of the retractable arm may be perpendicular to the main axis of the cylindrical frame in the extended position. In an exemplary embodiment, the plurality of retractable wheels may be equally spaced apart around a periphery of the outer surface of the cylindrical frame.

In an exemplary embodiment, maintaining an alignment between the main axis of the second pipe segment and the main axis of the pipeline may further include maintaining a second gap between an outer periphery of a bottom end of the cylindrical frame and an inner surface of the conduit constant by extending a retractable mechanism between the outer periphery of the bottom end of the cylindrical frame and the inner surface of the conduit.

In an exemplary embodiment, the retractable mechanism may include a main frame, a secondary frame, and a plurality of two-link mechanisms. In an exemplary embodiment, the main frame may be coupled fixedly to the cylindrical frame. In an exemplary embodiment, the plurality of two-link mechanisms may interconnect the main frame and the secondary frame. In an exemplary embodiment, each two-link mechanism of the plurality of two-link mechanisms may include a first link pivotally coupled to the secondary frame utilizing a first pivot joint, and a second link pivotally coupled to the main frame utilizing a second pivot joint.

In an exemplary embodiment, the second link and the first link may be interconnected utilizing a third pivot joint. In an exemplary embodiment, each wheel of the plurality of wheels may be coupled to a respective third pivot joint of a respective two-link mechanism. In an exemplary embodiment, each wheel may rotate around a respective second pivot joint responsive to linearly moving the secondary frame along a main axis of the main frame.

In an exemplary embodiment, extending the retractable mechanism between the outer periphery of the bottom end of the cylindrical frame and the inner surface of the conduit may include extending each wheel of the plurality of wheels from a retracted position to an extended position by moving the secondary frame along the main axis of the main frame.

In an exemplary embodiment, extending the retractable mechanism between the outer periphery of the bottom end of the cylindrical frame and the inner surface of the conduit may include extending each wheel of the plurality of wheels from the retracted position to the extended position. In an exemplary embodiment, a main axis of the first link may be perpendicular to the main axis of the main frame in the extended position. In an exemplary embodiment, the main axis of the first link may be parallel to the main axis of the main frame in the retracted position.

In an exemplary embodiment, attaching the top rim of the second pipe segment to the bottom rim of the first pipe segment may include welding the top rim of the second pipe segment to the bottom rim of the first pipe segment.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

The present disclosure is directed to exemplary systems and exemplary methods for installing a pipeline, such as a penstock of a hydropower plant, within a conduit or well. In traditional methods for installing a penstock of a hydropower plant, pipe segments are installed from a bottom end of the penstock toward a top end of the penstock. In this method, each pipe segment is attached on a top rim of a previously installed pipe segment. However, when an exemplary penstock needs to be installed within an exemplary inclined conduit or well, as mentioned in preceding sections, a rockfall within an exemplary inclined conduit or well may pose serious risks for any workers and for the equipment. According to one or more exemplary embodiments, an exemplary system and method for installing a pipeline within an inclined or vertical conduit or well may allow for installing pipe segments from a top end of the conduit or well instead of a bottom end of the conduit or well. In exemplary embodiments, installing pipe segments from a top end of the conduit and then welding subsequent pipe segments to a lower rim of a previously installed pipe segment, may allow for the workers and equipment to be within a previously installed pipe segment while attaching and welding a subsequent pipe segment bellow the previously installed pipe segment. Therefore, a previously installed pipe segment may provide a protective shield against rockfall within a conduit or well, within which the exemplary pipeline is being installed.

In further detail, in an exemplary method for installing a pipeline within an exemplary inclined or vertical conduit may allow for installing a first pipe segment at a top end of an exemplary conduit and then attaching other subsequent pipe segment bellow the exemplary first pipe segment. In exemplary embodiments, each subsequent pipe segment may be fed into an exemplary conduit from a bottom end of the conduit and then it may be lifted toward a lower rim of a previously installed pipe segment, where it may be welded to the previously installed pipe segment by the workers who are accommodated within the previously installed pipe segment. Therefore, the workers are protected against any possible rockfall within the conduit.

Figure 1:
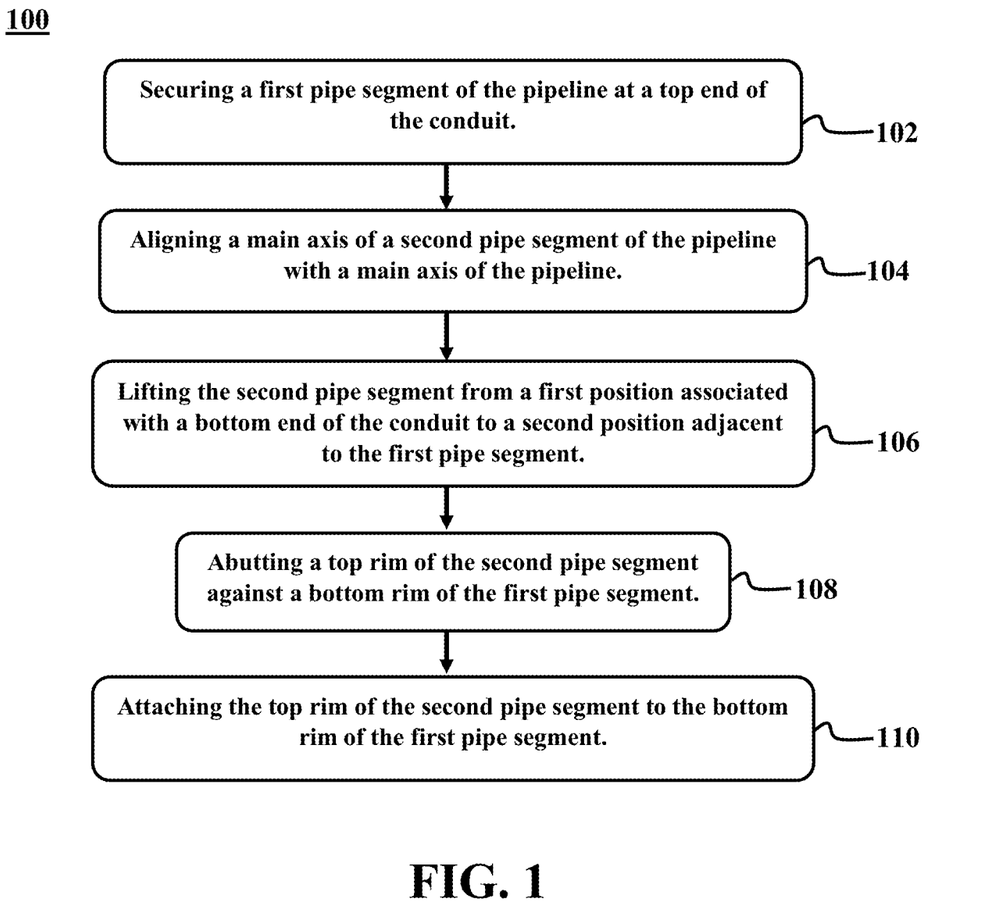
FIG. 1 illustrates a method for installing a pipeline within a conduit, consistent with one or more exemplary embodiments of the present disclosure.

FIG. 1 illustrates a method 100 for installing a pipeline within a conduit, consistent with one or more exemplary embodiments of the present disclosure. In an exemplary embodiment, method 100 may include a step 102 of securing a first pipe segment of the pipeline at a top end of the conduit, a step 104 of aligning a main axis of a second pipe segment of the pipeline with a main axis of the pipeline, a step 106 of lifting the second pipe segment from a first position associated with a bottom end of the conduit to a second position adjacent to a lower rim of the first pipe segment, a step 108 of abutting a top rim of the second pipe segment against the bottom rim of the first pipe segment, and a step 110 of attaching the top rim of the second pipe segment to the bottom rim of the first pipe segment. In an exemplary embodiment, an exemplary pipeline may include a plurality of pipe segments between the first pipe segment and the second pipe segment. In an exemplary embodiment, steps 102 to 110 of method 100 may be repeated for a plurality of pipe segments as described below.

In an exemplary embodiment, a main axis of each subsequent pipe segment may be aligned with a main axis of a previously installed pipe segment, each subsequent pipe segment may be lifted from a first position associated with a bottom end of the conduit to a second position adjacent to a lower rim of a previously installed pipe segment, a top rim of each subsequent pipe segment may be abutted against a lower rim of a previously installed pipe segment, and a top rim of each subsequent pipe segment may be attached to a lower rim of a previously installed pipe segment.

Figure 2A:
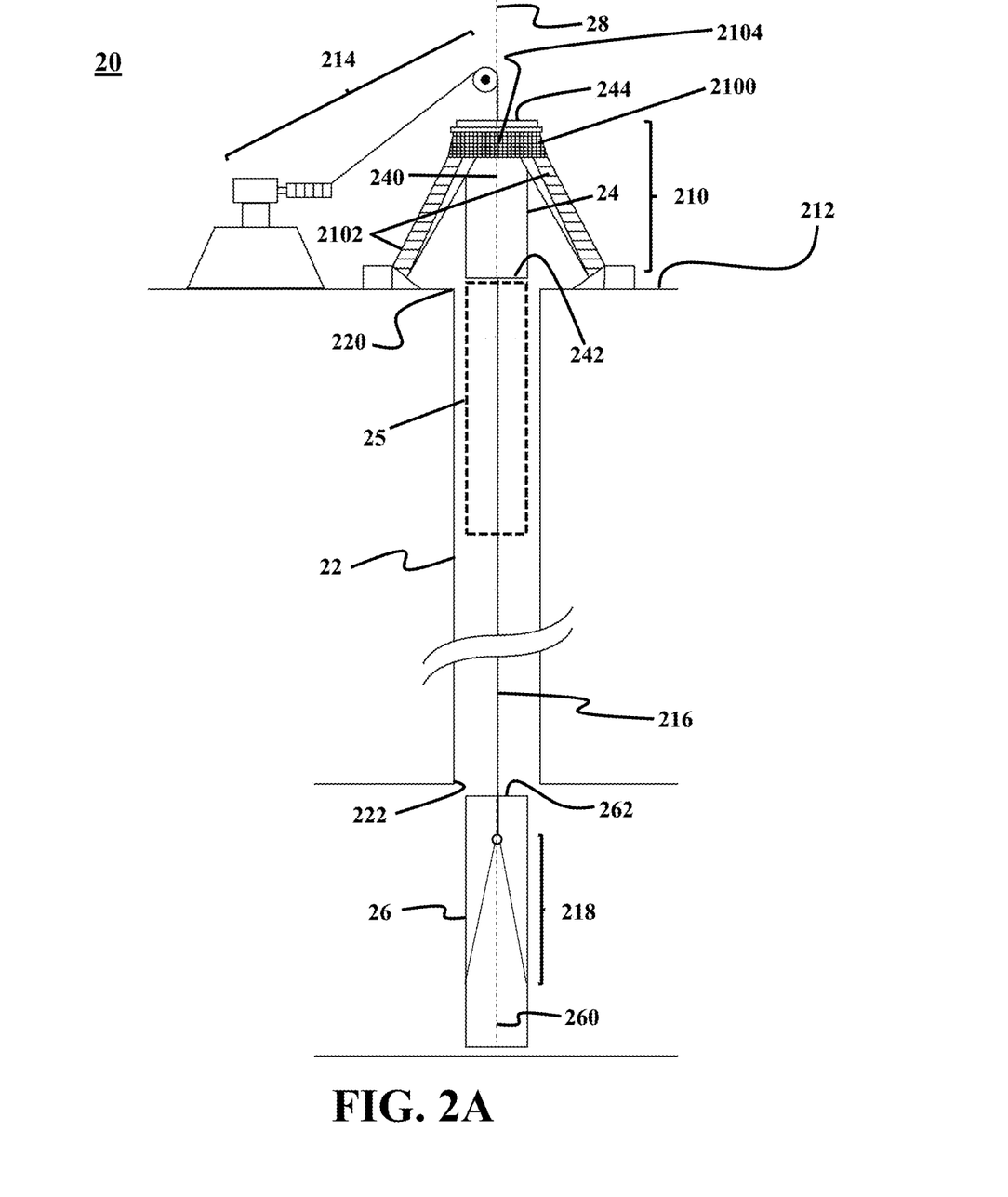
FIG. 2A illustrates a schematic side view of a system for installing a pipeline within a conduit, consistent with one or more exemplary embodiments of the present disclosure.

FIG. 2A illustrates a schematic side view of a system 20 for installing a pipeline within a conduit 22, consistent with one or more exemplary embodiments of the present disclosure. In an exemplary embodiment, system 20 may include a hanger structure 210 that may be mounted at a top end 220 of conduit 22. In an exemplary embodiment, hanger structure 210 may include a collar 2100 and a plurality of legs 2102 that may be interconnected between collar 2100 and a ground 212 surrounding a periphery of top end 220 of conduit 22. In an exemplary embodiment, plurality of legs 2102 may include a first leg 2102a, a second leg 2102b, and a third leg 2102c. In an exemplary embodiment, a main axis 2104 of collar 2100 may be aligned with a main axis 28 (overlapping main axis 2104 of collar 2100) of the pipeline. In an exemplary embodiment, plurality of legs 2102 may maintain the main axis of collar 2100 aligned with main axis 28 of the pipeline.

In an exemplary embodiment, step 102 of securing a first pipe segment of the pipeline at a top end of the conduit may include securing a first pipe segment of the pipeline at a top end of the conduit by coupling the top end of the first pipe segment with a collar of a hanger structure. For example, first pipe segment 24 may be secured at top end 220 of conduit 22 by coupling a top end 244 of first pipe segment 24 to collar 2100 of hanger structure 210 such that a main axis 240 of first pipe segment 24 may coincide main axis 28 of the pipe line.

In an exemplary embodiment, system 20 may further include a lifting mechanism that may include a winch 214 that may be coupled to a second pipe segment 26 utilizing a lifting assembly 218. Lifting assembly 218 may be disposed within a second pipe segment 26 and be connected to an inner surface of second pipe segment 26. In an exemplary embodiment, lifting assembly 218 may be connected to winch 214 utilizing a main cable 216. In an exemplary embodiment, step 106 of lifting the second pipe segment from a first position associated with a bottom end of the conduit to a second position adjacent to a lower rim of the first pipe segment may include lifting the second pipe segment utilizing a winch connected to a lifting assembly disposed within the second pipe segment. For example, winch 214 may be connected through main cable 216 to second pipe segment 26 utilizing lifting assembly 218. In an exemplary embodiment, winch 214 may be utilized for lifting second pipe segment 26 from a first position associated with a bottom end 222 of conduit 22 to a second position adjacent to first pipe segment 24 as shown by first broken lines 25.

Figure 2B:
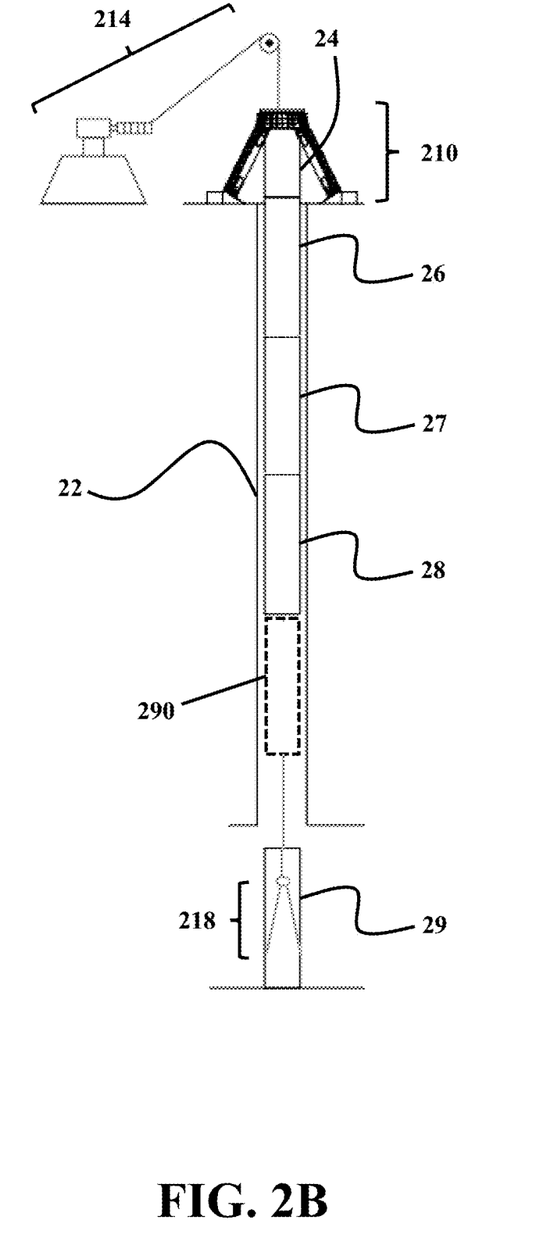
FIG. 2B illustrates a schematic side view of a system for installing a pipeline within a conduit, consistent with one or more exemplary embodiments of the present disclosure.

In an exemplary embodiment, a number of pipe segments of the pipeline may be installed. Then, in an exemplary embodiment, system 20 may be utilized for installing a subsequent pipe segment. FIG. 2B illustrates a schematic side view of system 20 for installing a pipeline within conduit 22, consistent with one or more exemplary embodiments of the present disclosure. For example, as shown in FIG. 2B, some exemplary pipe segments such as first pipe segment 24, second pipe segment 26, a third pipe segment 27, and a fourth pipe segment 28 may be installed inside conduit 22. Then, in an exemplary embodiment, winch 214 may be connected through main cable 216 to a fifth pipe segment 29 utilizing lifting assembly 218. In an exemplary embodiment, winch 214 may be utilized for lifting fifth pipe segment 29 from the first position associated with bottom end 222 of conduit 22 to a third position adjacent to fourth pipe segment 28 as shown by second broken lines 290. In an exemplary embodiment, it may be understood that winch 214 may be connected through main cable 216 to an exemplary pipe segment utilizing lifting assembly 218 and winch 214 may be utilized for lifting the exemplary pipe segment from the first position associated with bottom end 222 of conduit 22 to a position adjacent to a previously installed pipe segment.

Figure 3:
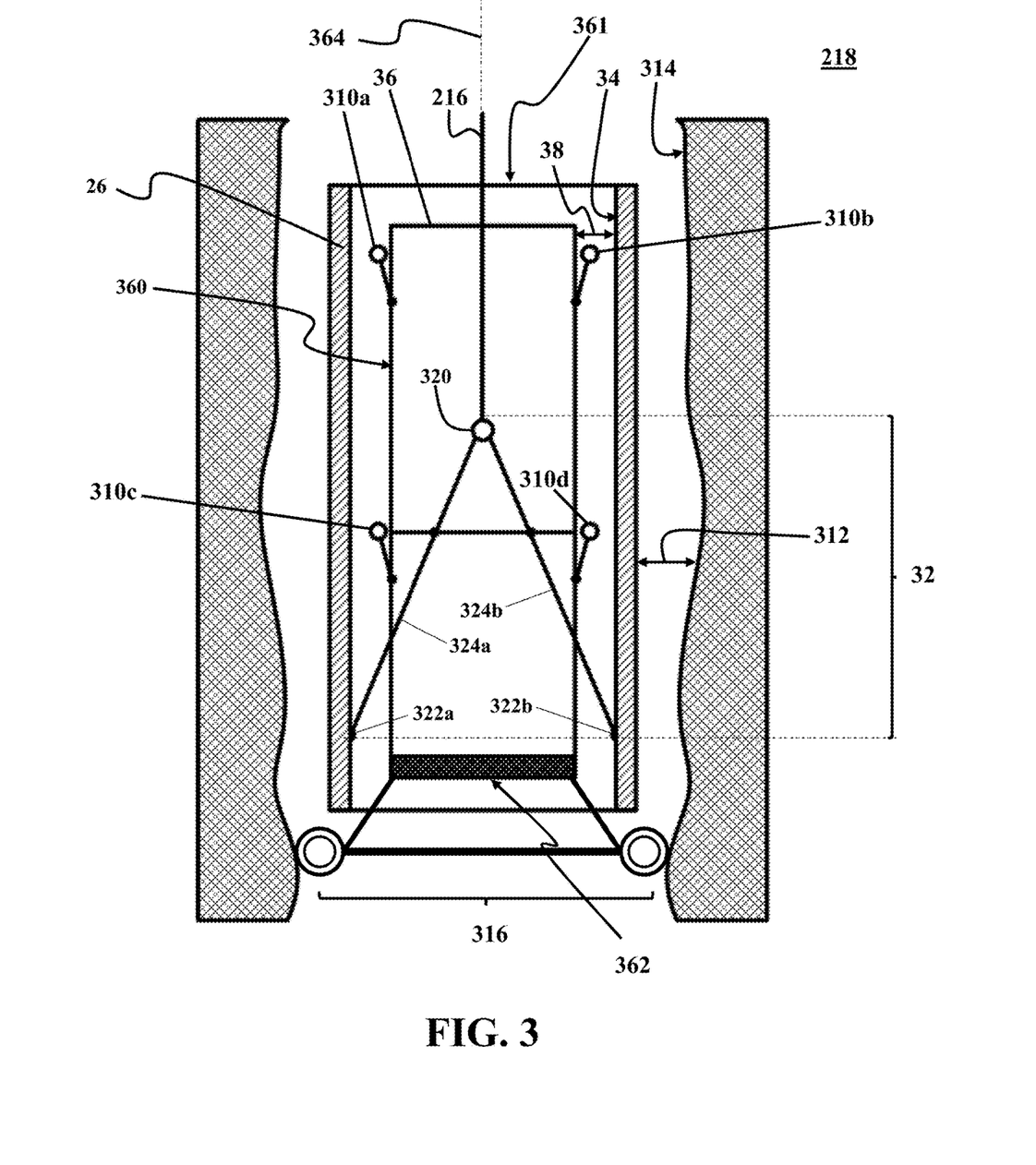
FIG. 3 illustrates a schematic side view of a lifting assembly, consistent with one or more exemplary embodiments of the present disclosure.

FIG. 3 illustrates a schematic side view of lifting assembly 218, consistent with one or more exemplary embodiments of the present disclosure. In an exemplary embodiment, lifting assembly 218 may include a chain sling 32 that may be connected to an inner surface 34 of a pipe segment, such as second pipe segment 26. In an exemplary embodiment, chain sling 32 may be coupled to a cylindrical frame 36. In an exemplary embodiment, chain sling 32 may include a main hook 320, a plurality of connecting hooks 322a-b that may be connected to inner surface 34 of second pipe segment 26, and a plurality of chains 324a-b that may interconnect plurality of connecting hooks 322a-b and main hook 320. In an exemplary embodiment, winch 214 may be connected to main hook 320 utilizing main cable 216. In an exemplary embodiment, lifting second pipe segment 26 may include winding up main cable 216 utilizing winch 214.

Figure 4:
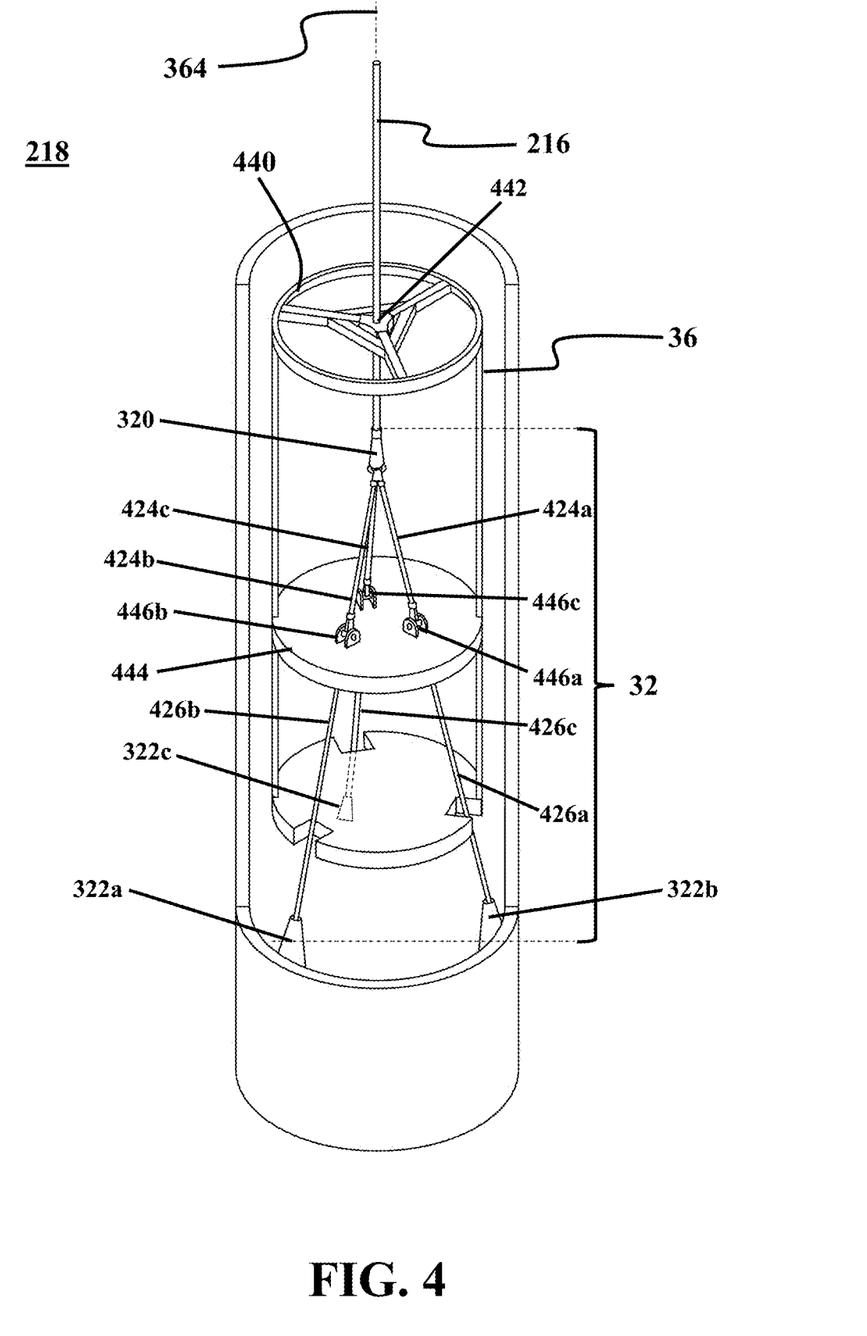
FIG. 4 illustrates a sectional perspective view of a lifting assembly, consistent with one or more exemplary embodiments of the present disclosure.

In an exemplary embodiment, lifting the second pipe segment may further include maintaining an alignment between the main axis of the second pipe segment and the main axis of the pipeline utilizing the lifting assembly. For example, lifting assembly 218 may be utilized to maintain an alignment between main axis 260 of second pipe segment 26 and main axis 28 of the pipeline. FIG. 4 illustrates a sectional perspective view of lifting assembly 218, consistent with one or more exemplary embodiments of the present disclosure. As shown in FIG. 4, in an exemplary embodiment, cylindrical frame 36 may be coaxially disposed within a pipe segment, such as second pipe segment 26. In an exemplary embodiment, maintaining an alignment between the main axis of the second pipe segment and the main axis of the pipeline may include maintaining a first gap between an outer surface of the cylindrical frame and an inner surface of the second pipe segment constant by extending a plurality of retractable wheels between the outer surface of the cylindrical frame and the inner surface of the second pipe segment. For example, as shown in FIG. 3, a plurality of retractable wheels including first retractable wheel 310a, second retractable wheel 310b, third retractable wheel 310c, and fourth retractable wheel 310d, may be extended between outer surface 360 of cylindrical frame 36 and inner surface 34 of second pipe segment 26, and, to thereby, a first gap 38 between outer surface 360 of cylindrical frame 36 and inner surface 34 of second pipe segment 26 may be maintained constant.

As further shown in FIG. 4, in an exemplary embodiment, chain sling 32 may include a first plurality of chains 424a-c and a second plurality of chains 426a-c. In an exemplary embodiment, first plurality of chains 424a-c and second plurality of chains 426a-c may interconnect plurality of connecting hooks 322a-b and main hook 320. In an exemplary embodiment, each of first plurality of chains 424a-c may be connected to a middle platform 444 of cylindrical frame 36. In an exemplary embodiment, each of first plurality of chains 424a-c may be connected to middle platform 444 utilizing a plurality of shackles 446a-c. For example, first chain 424a from first plurality of chains may be connected to middle platform 444 utilizing first shackle 446a.

In an exemplary embodiment, second plurality of chains 426a-c may also be connected to middle platform 444 of cylindrical frame 36. In an exemplary embodiment, each of second plurality of chains 426a-c may be connected to middle platform 444 utilizing plurality of shackles 446a-c. For example, fourth chain 446a from second plurality of chains may be connected to middle platform 444 utilizing first shackle 446a.

Furthermore, as shown in FIG. 4, in an exemplary embodiment, cylindrical frame 36 may include a central hole 442 at a center of a top end 440 of cylindrical frame 36. In an exemplary embodiment, main cable 216 may be passed through central hole 442. It may be understood that passing main cable 216 through central hole 442 may help cylindrical frame 36 to maintain its stability during moving up and down inside an exemplary conduit for example conduit 22.

Figure 5A:
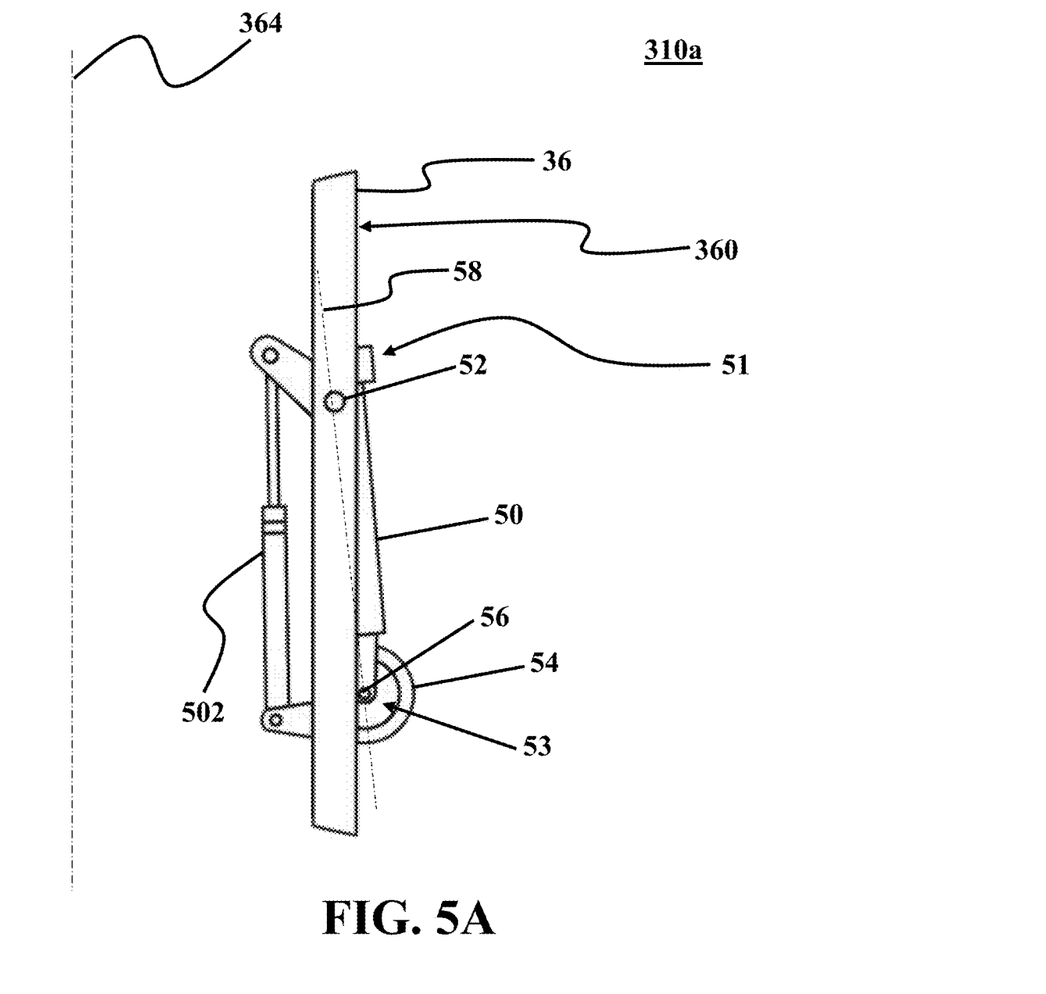
FIG. 5A illustrates side view of a retractable wheel in a retracted position, consistent with one or more exemplary embodiments of the present disclosure.
Figure 5B:
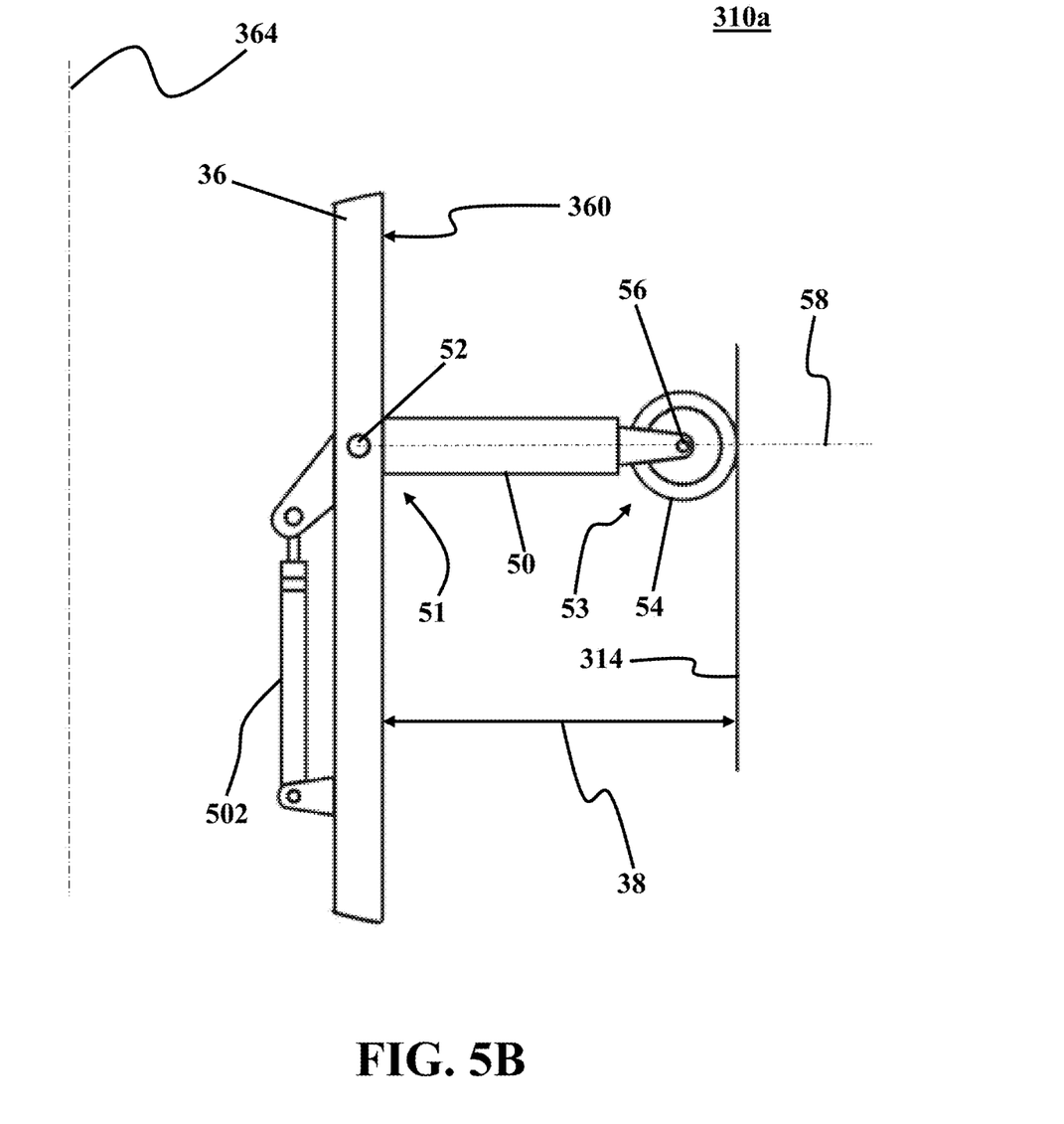
FIG. 5B illustrates side view of a retractable wheel in an extended position, consistent with one or more exemplary embodiments of the present disclosure.

FIG. 5A illustrates side view of an exemplary retractable wheel from the plurality of retractable wheels in a retracted position, consistent with one or more exemplary embodiments of the present disclosure and FIG. 5B illustrates side view of an exemplary retractable wheel from the plurality of retractable wheels in an extended position, consistent with one or more exemplary embodiments of the present disclosure In an exemplary embodiment, each retractable wheel from the plurality of retractable wheels may include a retractable arm that may be pivotally coupled to outer surface 360 of cylindrical frame 36 from a first end of the retractable arm. Furthermore, each retractable wheel from the plurality of retractable wheels may include a wheel that may be rotatably coupled to a second opposing end of the retractable arm. For example, as shown in FIG. 5A and FIG. 5B, first retractable wheel 310a may include a retractable arm 50 that may be pivotally coupled to outer surface 360 of cylindrical frame 36 from a first end 51 of retractable arm 50. In an exemplary embodiment, first retractable wheel 310a may further include a wheel 54. In an exemplary embodiment, wheel 54 may be rotatably coupled to a second opposing end 53 of retractable arm 50. In an exemplary embodiment, as shown in FIG. 5A, first retractable wheel 310a may be in a retracted position when a main axis 58 of retractable arm 50 is substantially parallel to a main axis 364 of cylindrical frame 36. It may be understood that the term "substantially parallel" may be intended to mean parallel or nearly parallel. In an exemplary embodiment, main axis 58 of retractable arm 50 is substantially parallel to main axis 364 of cylindrical frame 36 when an angle between main axis 58 of retractable arm 50 and main axis 364 of cylindrical frame 36 is less than, for example, 20°. In an exemplary embodiment, as shown in FIG. 5B, first retractable wheel 310a may be in an extended position when a main axis 58 of retractable arm 50 is substantially perpendicular to a main axis 364 of cylindrical frame 36. It may be understood that the term "substantially perpendicular" may be intended to mean perpendicular or nearly perpendicular. In an exemplary embodiment, main axis 58 of retractable arm 50 is substantially perpendicular to main axis 364 of cylindrical frame 36 when an angle between main axis 58 of retractable arm 50 and main axis 364 of cylindrical frame 36 is between, for example, 80° and 100°.

In an exemplary embodiment, as shown in FIG. 5A and FIG. 5B, retractable arm 50 may be connected pivotally to cylindrical frame 36 utilizing a fourth pivot 52. In an exemplary embodiment, wheel 54 may be connected pivotally to retractable arm 50 utilizing a sixth pivot 56. In an exemplary embodiment, it may be understood that second retractable wheel 310*b*, third retractable wheel 310*c*, and fourth retractable wheel 310*d* may be substantially analogous to first retractable wheel 310*a* in structure and functionality. As shown in FIG. 3, in an exemplary embodiment, first retractable wheel 310*a* and second retractable wheel 310*b* may be connected to outer surface 360 of cylindrical frame 36 at a position near to a top end 361 of cylindrical frame 36. In an exemplary embodiment, third retractable wheel 310*c* and fourth retractable wheel 310*d* may be connected to outer surface 360 of cylindrical frame 36 at a position near to a bottom end 361 of cylindrical frame 36.

In an exemplary embodiment, extending the plurality of retractable wheels between the outer surface of the cylindrical frame and the inner surface of the second pipe segment may include pivotally rotating the retractable arm from a retracted position to an extended position. For example, in order to extend the plurality of retractable wheels between outer surface 360 of cylindrical frame 36 and inner surface 34 of second pipe segment 26, retractable arm 50 may be rotated around fourth pivot 52 from the retracted position to the extended position. In an exemplary embodiment, retractable arm 50 may be coupled to a first actuator 502, for example, a first hydraulic jack. In an exemplary embodiment, first actuator 502 may be configured to actuate retractable arm 50 to rotate around fourth pivot 52. In an exemplary embodiment, the plurality of retractable wheels may be equally spaced apart around a periphery of outer surface 360 of cylindrical frame 36.

In an exemplary embodiment, maintaining an alignment between a main axis of the second pipe segment and a main axis of the pipeline may further include maintaining a second gap between an outer periphery of a bottom end of the cylindrical frame and an inner surface of the conduit constant by extending a retractable mechanism between the outer periphery of the bottom end of the cylindrical frame and the inner surface of the conduit. For example, as shown in FIG. 3, in an exemplary embodiment, a retractable mechanism 316 may be extended between an outer periphery of bottom end 362 of cylindrical frame 36 and inner surface 314 of conduit 22 to maintain a second gap 312 between the outer periphery of bottom end 362 of cylindrical frame 36 and inner surface 314 of conduit 22.

Figure 6A:
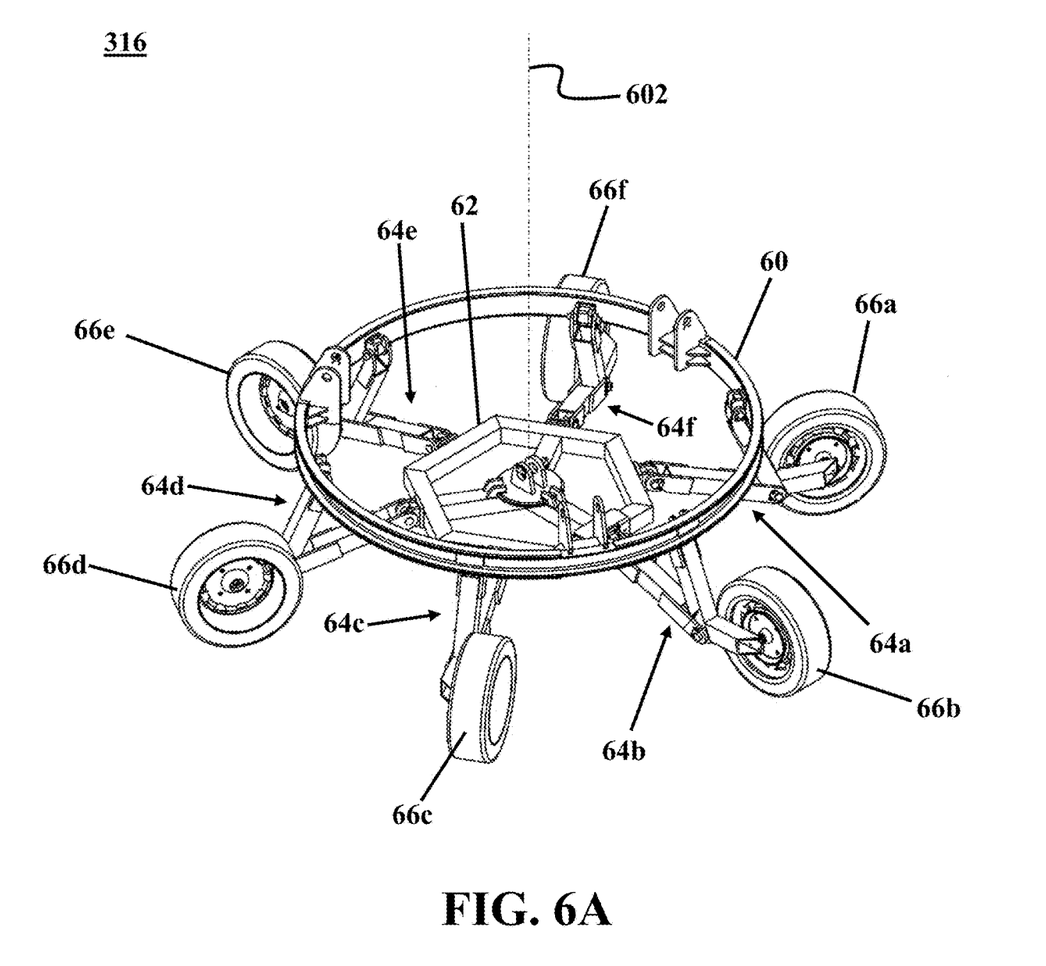
FIG. 6A illustrates a perspective view of a retractable mechanism, consistent with one or more exemplary embodiments of the present disclosure.

FIG. 6A illustrates a perspective view of a retractable mechanism 316, consistent with one or more exemplary embodiments of the present disclosure. As shown in FIG. 6A, in an exemplary embodiment, retractable mechanism 316 may include a main frame 60 that may be fixedly attached to cylindrical frame 36. In an exemplary embodiment, cylindrical frame 36 may include a ring shape. In an exemplary embodiment, retractable mechanism 316 may further include a secondary frame 62. In an exemplary embodiment, secondary frame 62 may include a hexagonal shape. In an exemplary embodiment, retractable mechanism 316 may further include a plurality of two-link mechanisms such as a first two-link mechanism 64*a*, a second two-link mechanism 64*b*, a third two-link mechanism 64*c*, a fourth two-link mechanism 64*d*, a fifth two-link mechanism 64*e*, and a sixth two-link mechanism 64*f*. In an exemplary embodiment, the plurality of two-link mechanisms may interconnect main frame 60 and secondary frame 62. In an exemplary embodiment, retractable mechanism 316 may further include a plurality of wheels such as a first wheel 66*a*, a second wheel 66*b*, a third wheel 66*c*, a fourth wheel 66*d*, a fifth wheel 66*e*, and a sixth wheel 66*f*.

Figure 6B:
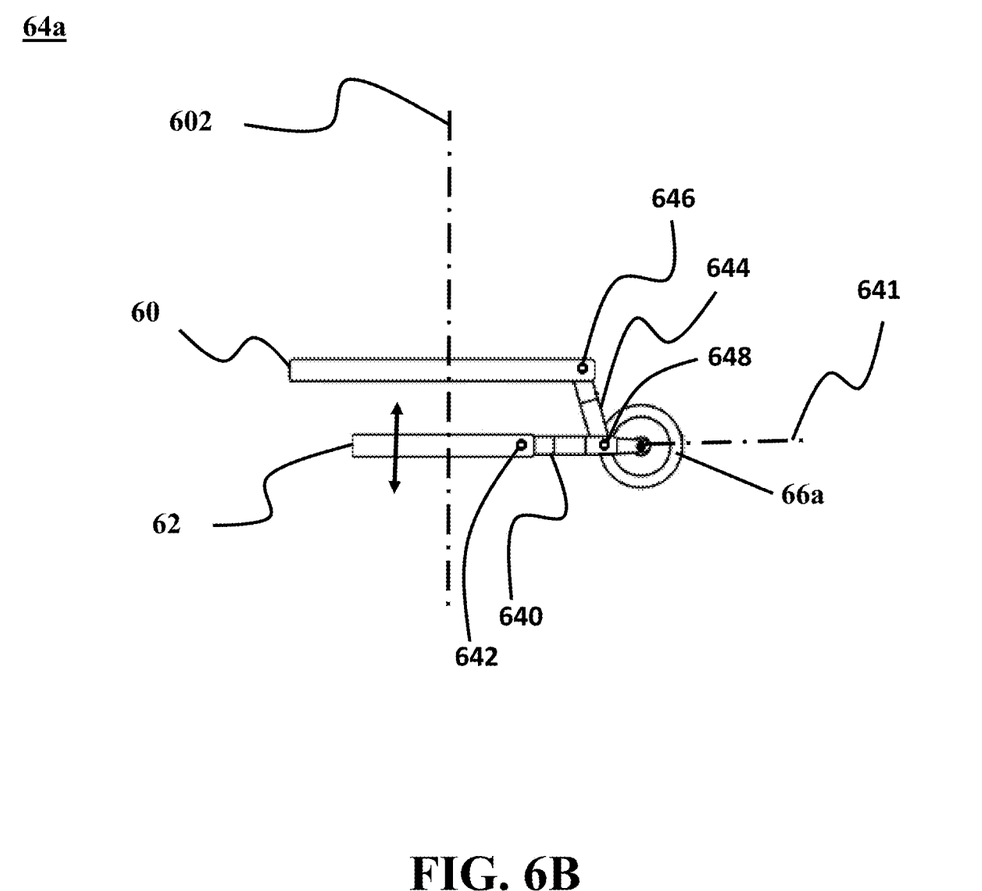
FIG. 6B illustrates a side view of a two-link mechanism in an extended position, consistent with one or more exemplary embodiments of the present disclosure.
Figure 6C:
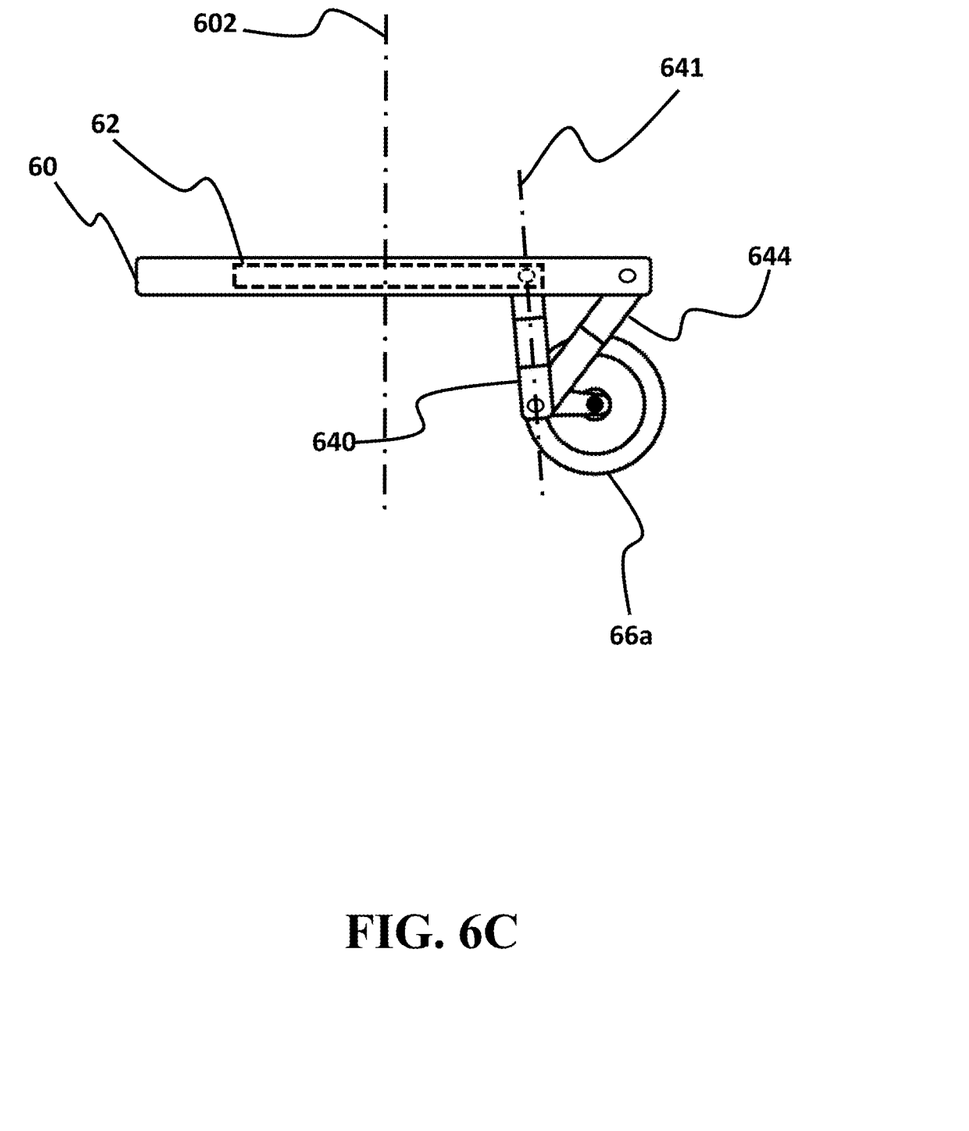
FIG. 6C illustrates a side view of a two-link mechanism in a retracted position, consistent with one or more exemplary embodiments of the present disclosure.

In an exemplary embodiment, each two-link mechanism of the plurality of two-link mechanisms may include a first link pivotally coupled to the secondary frame utilizing a first pivot joint. Each two-link mechanism of the plurality of two-link mechanisms may further include a second link pivotally coupled to the main frame utilizing a second pivot joint. In an exemplary embodiment, the second link and the first link may be interconnected utilizing a third pivot joint. FIG. 6B illustrates a side view of first two-link mechanism 64*a* in an extended position, consistent with one or more exemplary embodiments of the present disclosure. FIG. 6C illustrates a side view of first two-link mechanism 64*a* in a retracted position, consistent with one or more exemplary embodiments of the present disclosure. As shown in FIG. 6B and FIG. 6C, in an exemplary embodiment, first two-link mechanism 64*a* may include a first link 640 that may be pivotally coupled to secondary frame 62 utilizing a first pivot joint 642. First two-link mechanism 64*a* may further include a second link 644 pivotally coupled to main frame 60 utilizing a second pivot joint 646. In an exemplary embodiment, second link 644 and first link 640 may be interconnected utilizing a third pivot joint 648.

As shown in FIG. 6B, when first two-link mechanism 64*a* is in the extended position, a main axis 641 of first link 640 may be substantially perpendicular to main axis 602 of main frame 60. It may be understood that the term "substantially perpendicular" may be intended to mean perpendicular or nearly perpendicular. In an exemplary embodiment, main axis 641 of first link 640 is substantially perpendicular to main axis 602 of main frame 60 when an angle between main axis 641 of first link 640 and main axis 602 of main frame 60 is between, for example, 80° and 100°.

As shown in FIG. 6C, when first two-link mechanism 64*a* is in the retracted position, a main axis 641 of first link 640 may be substantially parallel to main axis 602 of main frame 60. It may be understood that the term "substantially parallel" may be intended to mean parallel or nearly parallel. In an exemplary embodiment, main axis 641 of first link 640 is substantially parallel to main axis 602 of main frame 60 when an angle between main axis 641 of first link 640 and main axis 602 of main frame 60 is less than, for example, 20°.

As shown in FIG. 6A, in an exemplary embodiment, each wheel of the plurality of wheels may be connected to a respective third pivot joint of a respective two-link mechanism. Each wheel may rotate around a respective second pivot joint in response to linearly moving the secondary frame along a main axis 602 of main frame 60. For example, as shown in FIG. 6B and FIG. 6C, in an exemplary embodiment, first wheel 66*a* may be connected fixedly to third pivot joint 648. In an exemplary embodiment, first wheel 66*a* may rotate around second pivot joint 646 responsive to linearly moving secondary frame 62 along main axis 602 of main frame 60.

In an exemplary embodiment, secondary frame 62 may be coupled to a second actuator, for example a second hydraulic jack. The second actuator may be configured to actuate secondary frame 62 to move linearly along main axis 602 of main frame 60.

In an exemplary embodiment, extending retractable mechanism 316 between the outer periphery of bottom end 362 of cylindrical frame 36 and inner surface 314 of conduit 22 may include extending each wheel of the plurality of wheels from a retracted position to an extended position by moving secondary frame 62 along main axis 602 of main frame 60. For example, secondary frame 62 may be moved downwardly along main axis 602 of main frame 60 to extend first wheel 66a from the retracted position to the extended position. Also, secondary frame 62 may be moved upwardly along main axis 602 of main frame 60 to retract first wheel 66a from the extended position to the retracted position.

Referring back to FIG. 2A, in an exemplary embodiment, abutting a top rim of the second pipe segment against a bottom rim of the first pipe segment may include abutting a top rim 262 of second pipe segment 26 to a bottom rim 242 of first pipe segment 24. In an exemplary embodiment, abutting a top rim 262 of second pipe segment 26 to a bottom rim 242 of first pipe segment 24 may include adjusting a shape and a size of top rim 262 of second pipe segment 26 to a shape and a size of bottom rim 242 of first pipe segment 24 through hammering an internal side of top rim 262 of second pipe segment 26 and internal side of bottom rim 242 of first pipe segment 24. In an exemplary embodiment, attaching the top rim of the second pipe segment to the bottom rim of the first pipe segment may include welding a top rim 262 of second pipe segment 26 to a bottom rim 242 of first pipe segment 24. It may be understood that, in an exemplary embodiment, after that an exemplary pipe segment lifted up to a position adjacent to a previously installed pipe segment, a top rim of the exemplary pipe segment may be abutted against a bottom rim of the previously installed pipe segment and then the top rim of the exemplary pipe segment may be welded to the bottom rim of the previously installed pipe segment. For example, referring back to FIG. 2B, in an exemplary embodiment, after that fifth pipe segment 29 is lifted up to a position adjacent to fourth pipe segment 28 as shown by second broken lines 290, a top rim of fifth pipe segment 29 may be abutted against a bottom rim of fourth pipe segment 28 and then the top rim of fifth pipe segment 29 may be welded to the bottom rim of fourth pipe segment 28.

In an exemplary embodiment, after that first pipe segment 24 is mounted onto collar 2100 of hanger structure 210, each pipe segment may be lifted up to a position adjacent to a previously installed pipe segment and then a top rim of the pipe segment may be abutted against a bottom rim of the previously installed pipe segment and then the top rim of the pipe segment may be welded against a bottom rim of the previously installed pipe segment. These steps may be repeated for all pipe segments of the pipeline in order to complete the pipeline installation.

Figure 7:
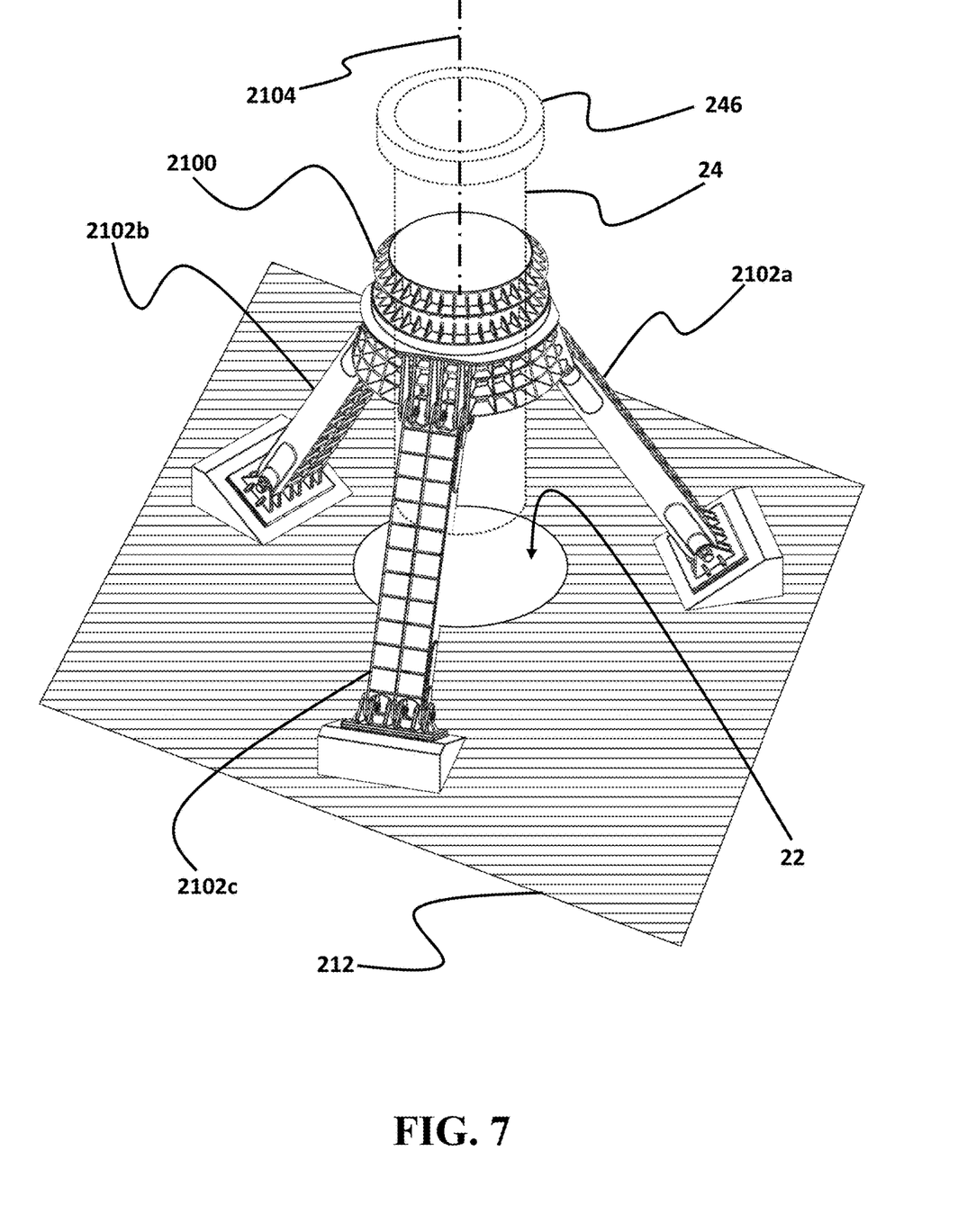
FIG. 7 illustrates a perspective view of a hanger structure, consistent with one or more exemplary embodiments of the present disclosure.

FIG. 7 illustrates a perspective view of a hanger structure, consistent with one or more exemplary embodiments of the present disclosure. As shown in FIG. 7, in an exemplary embodiment, first pipe segment 24 may include a neck segment 246 at top end 244 of first pipe segment 24. In an exemplary embodiment, coupling top end 244 of first pipe segment 24 to collar 2100 of hanger structure 210 may include mounting first pipe segment 24 from neck segment 246 onto collar 2100. In an exemplary embodiment, after installing all pipe segments of the pipeline, first pipe segment 24 and hanger structure 210 may be removed. In an exemplary embodiment, whole of first pipe segment 24 may be removed or otherwise, in an exemplary embodiment, an upper part of first pipe segment 24 may be removed. In an exemplary embodiment, after installing all pipe segments of the pipeline, first pipe segment 24 may be cut from a horizontal section perpendicular to main axis 240 of first pipe segment 24. Then, in an exemplary embodiment, a top part of first pipe segment 24 may be removed from collar 2100 of hanger structure 210. Due to the fact that by removing the top part of first pipe segment 24, the engagement between hanger structure 210 and the pipeline no longer exists, in an exemplary embodiment, after removing first pipe segment 24 from collar 2100 of hanger structure 210, hanger structure 210 may be removed easily.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study, except where specific meanings have otherwise been set forth herein. Relational terms such as "first" and "second" and the like may be used solely to distinguish one entity or action from another without necessarily requiring or implying any actual such relationship or order between such entities or actions. The terms "comprises," "comprising," or any other variation thereof, as used herein and in the appended claims are intended to cover a non-exclusive inclusion, encompassing a process, method, article, or apparatus that comprises a list of elements that does not include only those elements but may include other elements not expressly listed to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is not intended to be used to interpret or limit the scope or meaning of the claims. In addition, in the foregoing Detailed Description, it can be seen that various features are grouped together in various implementations. Such grouping is for purposes of streamlining this disclosure and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into this Detailed Description, with each claim standing on its own as a separately claimed subject matter.

While various implementations have been described, the description is intended to be exemplary, rather than limiting and it will be apparent to those of ordinary skill in the art that many more implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in the light of the attached claims and their equivalents. Also, various modifications and changes may be made within the scope of the attached claims.

What is claimed is:

1. A method for installing a pipeline within a conduit, the method comprising:
   securing a first pipe segment of the pipeline at a top end of the conduit, a main axis of the first pipe segment coinciding with a main axis of the pipeline;
   aligning a main axis of a second pipe segment of the pipeline with the main axis of the pipeline;
   lifting the second pipe segment from a first position associated with a bottom end of the conduit to a second position adjacent to the first pipe segment, lifting the second pipe segment comprises lifting the second pipe segment utilizing a lifting mechanism coupled to the second pipe segment, the lifting mechanism comprising:
      a lifting assembly comprising a chain sling, the chain sling comprising:
         a main hook;
         a plurality of connecting hooks releasably connected to an inner surface of the second pipe segment; and
         a plurality of chains interconnecting the plurality of connecting hooks and the main hook; and
      a winch coupled to the main hook utilizing a main cable, wherein lifting the second pipe segment comprises winding up the main cable utilizing the winch;
   abutting a top rim of the second pipe segment against a bottom rim of the first pipe segment; and
   attaching the top rim of the second pipe segment to the bottom rim of the first pipe segment.

2. The method of claim 1, further comprising:
   aligning a main axis of each pipe segment of the pipeline with the main axis of the pipeline;
   lifting the each pipe segment from a first position associated with the bottom end of the conduit to a respective position adjacent to a previously installed pipe segment;
   abutting a top rim of the each pipe segment against a bottom rim of the previously installed pipe segment; and
   attaching the top rim of the each pipe segment to the bottom rim of the previously installed pipe segment.

3. The method of claim 1, wherein securing the first pipe segment at the top end of the conduit comprises mounting the first pipe segment onto a hanger structure from a top end of the first pipe segment, the hanger structure comprising:
   a collar, a main axis of the collar aligned with the main axis of the pipeline; and
   a plurality of legs interconnected between the collar and a ground surrounding a periphery of the top end of the conduit, the plurality of legs maintaining the main axis of the collar aligned with the main axis of the pipeline, wherein securing the first pipe segment at the top end of the conduit comprises coupling the top end of the first pipe segment with the collar.

4. The method of claim 1, wherein maintaining an alignment between the main axis of the second pipe segment and the main axis of the pipeline further comprises maintaining a second gap between an outer periphery of a bottom end of the cylindrical frame and an inner surface of the conduit constant by extending a retractable mechanism between the outer periphery of the bottom end of the cylindrical frame and the inner surface of the conduit.

5. The method of claim 4, wherein the retractable mechanism comprises:
   a main frame fixedly coupled to the cylindrical frame;
   a secondary frame; and
   a plurality of two-link mechanisms interconnecting the main frame and the secondary frame, each two-link mechanism of the plurality of two-link mechanisms comprising:
      a first link pivotally coupled to the secondary frame utilizing a first pivot joint; and
      a second link pivotally coupled to the main frame utilizing a second pivot joint, the second link and the first link interconnected utilizing a third pivot joint; and
   a plurality of wheels, each wheel of the plurality of wheels coupled to a respective third pivot joint of a respective two-link mechanism, wherein each wheel rotates around a respective second pivot joint responsive to linearly moving the secondary frame along a main axis of the main frame.

6. The method of claim 4, wherein extending the retractable mechanism between the outer periphery of the bottom end of the cylindrical frame and the inner surface of the conduit comprises extending each wheel of a plurality of wheels from a retracted position to an extended position by moving a secondary frame along a main axis of a main frame.

7. The method of claim 4, wherein extending the retractable mechanism between the outer periphery of the bottom end of the cylindrical frame and the inner surface of the conduit comprises extending each wheel of a plurality of wheels from a retracted position to an extended position, a main axis of a first link perpendicular to a main axis of a main frame in the extended position, a main axis of the first link parallel to a main axis of the main frame in the retracted position.

8. The method of claim 1, wherein attaching the top rim of the second pipe segment to the bottom rim of the first pipe segment comprises welding the top rim of the second pipe segment to the bottom rim of the first pipe segment.

9. A method for installing a pipeline within a conduit, the method comprising:
   securing a first pipe segment of the pipeline at a top end of the conduit, a main axis of the first pipe segment coinciding with a main axis of the pipeline;
   aligning a main axis of a second pipe segment of the pipeline with the main axis of the pipeline;

lifting the second pipe segment from a first position associated with a bottom end of the conduit to a second position adjacent to the first pipe segment, lifting the second pipe segment comprising maintaining an alignment between the main axis of the second pipe segment and the main axis of the pipeline utilizing the lifting assembly, the lifting assembly further comprising:
- a cylindrical frame coaxially disposed within the second pipe segment, maintaining an alignment between the main axis of the second pipe segment and the main axis of the pipeline comprising maintaining a first gap between an outer surface of the cylindrical frame and an inner surface of the second pipe segment constant by extending a plurality of retractable wheels between the outer surface of the cylindrical frame and the inner surface of the second pipe segment;

abutting a top rim of the second pipe segment against a bottom rim of the first pipe segment; and attaching the top rim of the second pipe segment to the bottom rim of the first pipe segment.

10. The method of claim 9, wherein each retractable wheel of the plurality of retractable wheels comprises:
- a retractable arm pivotally coupled to the outer surface of the cylindrical frame from a first end of the retractable arm; and
- a wheel rotatably coupled to a second opposing end of the retractable arm,
- wherein extending the plurality of retractable wheels between the outer surface of the cylindrical frame and the inner surface of the second pipe segment comprises pivotally rotating the retractable arm from a retracted position to an extended position, a main axis of the retractable arm parallel to a main axis of the cylindrical frame in the retracted position, the main axis of the retractable arm perpendicular to the main axis of the cylindrical frame in the extended position; and
- wherein the plurality of retractable wheels are equally spaced apart around a periphery of the outer surface of the cylindrical frame.

\* \* \* \* \*